Figure 3:
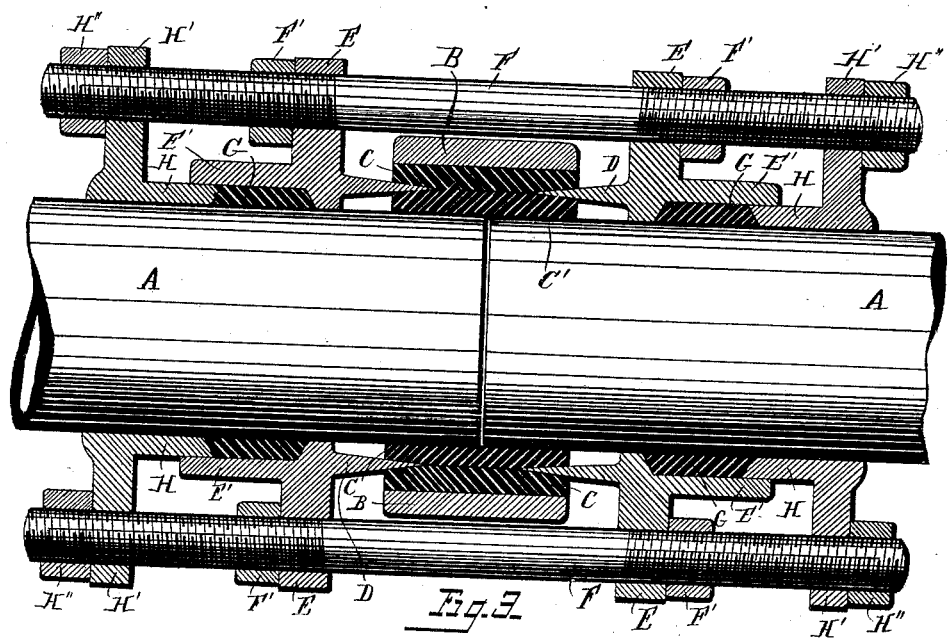

(No Model.)
W. BRAMWELL.
PIPE COUPLING.
No. 436,574.  Patented Sept. 16, 1890.
2 Sheets—Sheet 1.
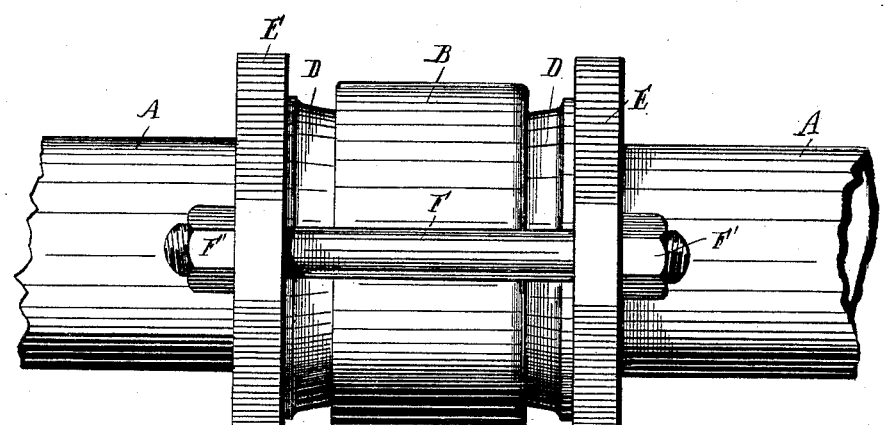
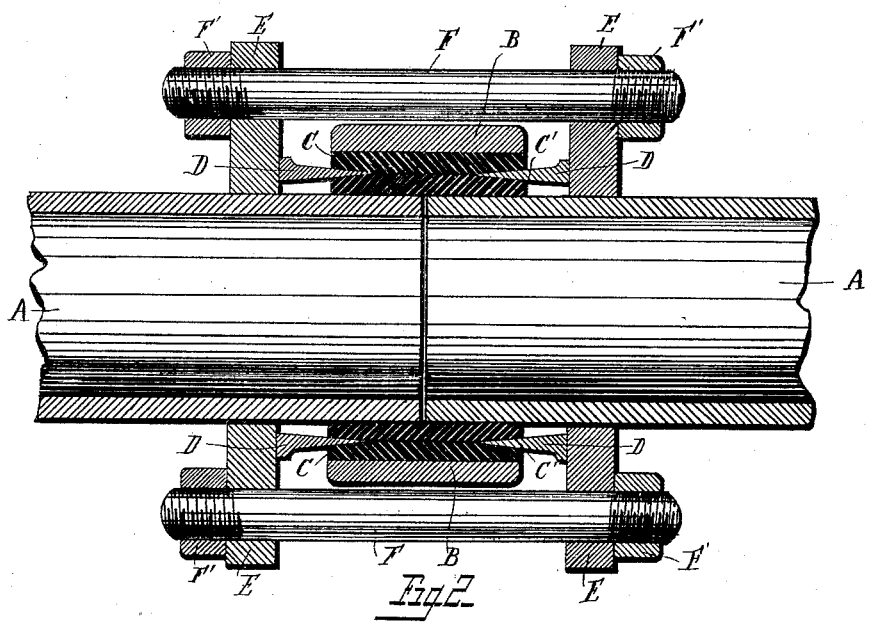
WITNESSES
Carroll J. Webster.
Anna J. Delaney.
INVENTOR
William Bramwell
By William Webster
Atty (No Model.) 2 Sheets—Sheet 2.

W. BRAMWELL.
PIPE COUPLING.

No. 436,574. Patented Sept. 16, 1890.

WITNESSES
Carroll J. Webster.
Anna G. Dehaney.

INVENTOR
William Bramwell
By William Webster
Atty

UNITED STATES PATENT OFFICE.

WILLIAM BRAMWELL, OF TOLEDO, OHIO.

PIPE-COUPLING.

SPECIFICATION forming part of Letters Patent No. 436,574, dated September 16, 1890.

Application filed November 1, 1889. Serial No. 328,979. (No model.)

*To all whom it may concern:*

Be it known that I, WILLIAM BRAMWELL, a citizen of the United States, residing at Toledo, in the county of Lucas and State of Ohio, have invented certain new and useful Improvements in Pipe-Couplings; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to pipe-couplings, and is designed for use in securing the sections of tubular conduits for gases or liquids with a tight joint to prevent separation or leakage.

The object of the invention is to provide a rigid coupling for the pipe that shall be inexpensive of construction and that shall effectively prevent leakage at the point of joinder of the sections.

A further object is to provide a coupling that will allow of the removal of a section of pipe without disturbing the remainder of the line or necessitating cutting of the section to be removed.

The invention consists in the parts and combination of parts hereinafter described, and pointed out in the claims.

In the drawings, Figure 1 is a plan view of two sections of pipe secured and joined by my improved coupling. Fig. 2 is a longitudinal sectional view of the same. Fig. 3 is a longitudinal vertical section of a modified form of coupling with the two sections of pipe shown in full lines.

A A designate the two sections of pipe to be coupled. B designates a metal ring of greater diameter than the pipes and encircling the same at the meeting ends of the two.

C and C' designate encircling bands of a soft metal, preferably of lead, the outer band C fitting closely within the metal ring B and the inner band C' fitting closely upon and overlapping the joint formed by the meeting ends of the pipe-sections.

D designates an annular wedge, the apex of the wedge being of a diameter corresponding to the annular space between the rings C and C', the taper of the wedge both upon the external and internal area thereof being sufficient to contract the inner ring upon the pipe-sections at the point of contact with the wedge, and to expand the outer ring C against the ring B, thereby forming a sealed joint at the point where the two pipes meet, there being an annular wedge upon each side of the rings B, C, and C', respectively, which are caused to approach each other by means of plates E, perforated centrally to closely fit upon the pipe-sections and abut against the rear sides of the annular wedges and to be caused to approach each other by means of rods F, passed through perforations formed in the plates concentric to the pipe, the rods being threaded upon each end and provided with nuts F', by which to move the plates to cause the annular wedge to be forced between the soft-metal rings C C'.

In Fig. 3 is shown a modified form of construction of the coupling, in which the annular wedge is formed integral with the plates E, there being also an annulus E' formed upon the opposite side of each plate, of a diameter to allow a packing G to be interposed between the pipe and annulus and be compacted by means of a ring H, of a diameter to closely fit within the annulus E' and bear against the packing when urged toward the same by means of the threaded rods F, which pass through perforations in a flange H', formed integral with ring H and being provided with nuts H'', by which to move the same, the rods F passing through the plates F', as has been heretofore described. By this construction when the nuts F' are tightened upon the plates E the wedge D is caused to move between the soft-metal rings and effectively seal the joint between the pipe-sections, and as an additional precaution against leakage in high-pressure mains the packing G is forced between the pipe-section and the annulus E' by means of the telescoping ring H as it is moved against the packing by means of the nuts upon the extended threaded ends of rods F', thereby arresting any volatile or liquid matter that may have passed the seal caused by the soft-metal rings, should such leakage occur.

In the use of a plurality of encircling rings the pipe-sections are rigidly sustained in horizontal position, and the number of sealing-rings increased thereby more thoroughly guarding against leakage of the joint.

It will be seen that in the constructions described a section can be readily removed from the main by simply slipping the coupling to one side of the joint, when the pipe may be raised from its position—a feature of great value as contradistinguished from those forms of coupling wherein the pipes are telescopically screwed together—and in order to remove a section it is necessary to cut one of the pipes.

From the above description it will be seen that by the gradual and forcible entrance of the annular wedge between the soft-metal rings, the effect is to cause the metal of the inner ring to seat into the irregular surface indentations and crevices of the pipe and effectually seal the same from the escape of the fluid contained within the pipe, and that the coupling is operated without finishing—i. e., turning, filing, or fitting—of the parts, as the ductility of the rings C C' allows the same to intermesh with the rough parts of the wedge-ring B or pipes.

While I have shown and described two soft-metal rings C C', in some forms of couplings I employ but one ring C' and allow the outer edge of the annular wedge to bear directly against the ring B.

While I have described the rings C C' as formed of soft metal, I wish it to be understood that any compressible material—such as rubber, leather, or any fibrous material having elasticity—will equally subserve the purpose and is within the scope of my invention.

What I claim, and desire to secure by Letters Patent, is—

1. In a coupling for pipe-sections, a compressible packing concentric to the pipe and covering the ends of said sections, a non-elastic annulus surrounding the packing, in combination with a movable wedge interposed between the compressible packing and non-elastic annulus, as and for the purpose set forth.

2. In a pipe-coupling, the combination, with two adjoining pipe-sections, of an encircling-band over the joint of said sections, two concentric compressible packing-sections within said band and overlying the joint, and a wedge-faced ring upon each side of the packing-sections coincident with and adapted to be forced between said sections, as and for the purpose set forth.

3. In a pipe-coupling, the combination, with two adjoining pipe-sections, of an encircling band over the joint of said sections, a compressible packing within said band and over the joint, two rings upon each section, the inner ones being provided with a cuneal projection upon the front side and a plain projection upon the rear side, the outer rings provided with forward projections resting upon the pipe, a supplemental packing encircling the pipe in front of the rear rings, and screw-threaded rods passed through the rings and provided with nuts, as and for the purpose set forth.

In testimony that I claim the foregoing as my own I hereby affix my signature in presence of two witnesses.

WILLIAM BRAMWELL.

Witnesses:
WILLIAM WEBSTER,
CARROLL J. WEBSTER.